Patented Apr. 22, 1941

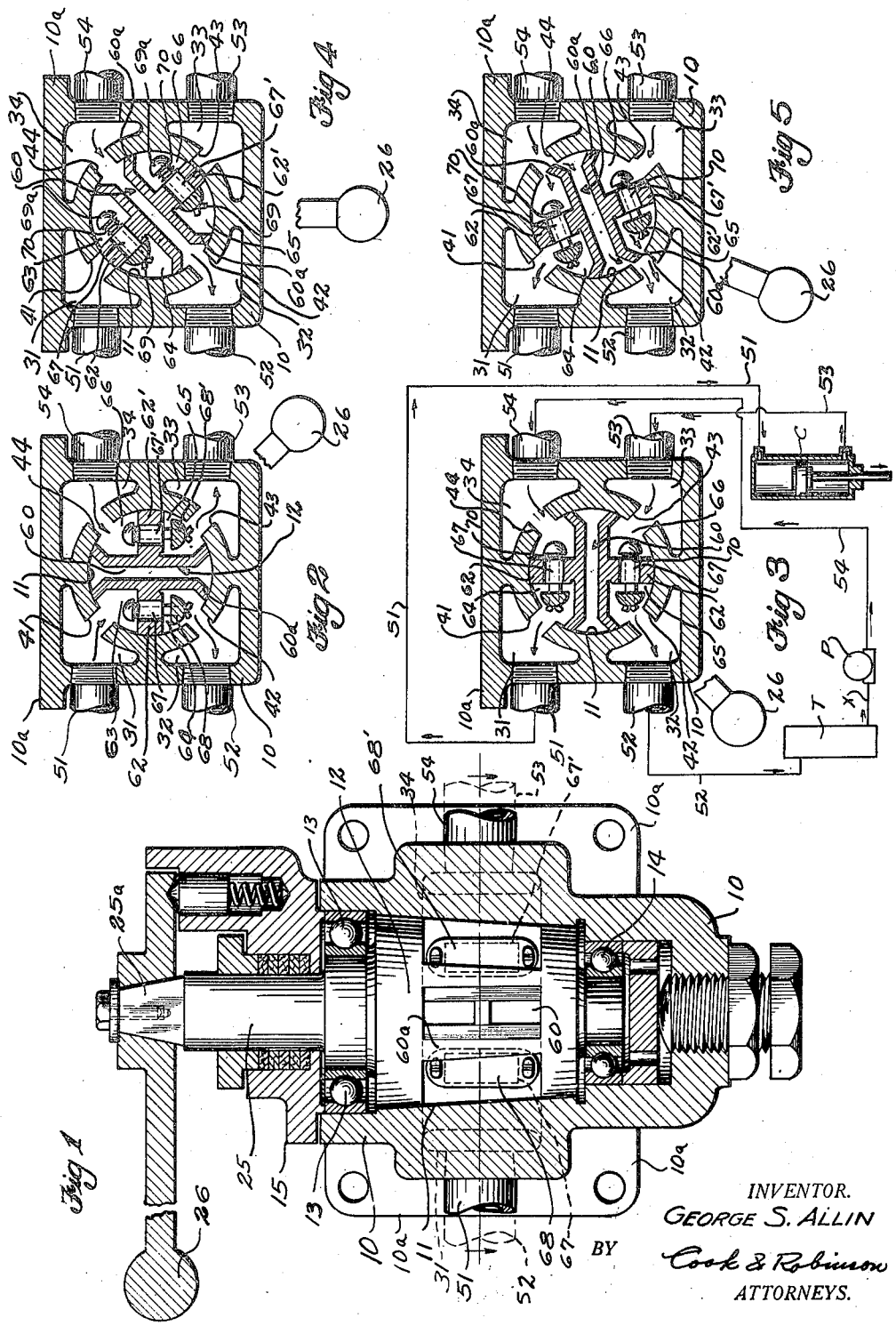

2,239,139

UNITED STATES PATENT OFFICE 2,239,139

UNIFLOW VALVE

George S. Allin, Seattle, Wash.

Application September 18, 1939, Serial No. 295,463

5 Claims. (Cl. 277—64)

This invention relates to improvements in valves and has reference more particularly to control valves for use in connection with hydraulic power systems wherein a plurality of pressure lines are employed in connection with a pressure pump, and wherein the valve serves as the means of control for selectively directing a hydraulic pressure medium delivered under pressure by the pump to one of the pressure lines while permitting a return or relief flow from another line through the valve back to the source of supply of pressure medium.

More specifically stated, this invention relates to improvements in control valves for hydraulic power systems wherein the hydraulic medium is continually circulating under pressure in a circuit which includes the circulating pump and a reservoir or supply tank for the pressure medium; it being the principal object of this invention to provide a two-way control valve in combination with the pipe connections and pressure supplying device, whereby the hydraulic pressure medium may be directed selectively to either end of a hydraulic jack, or the like, by definite adjustments of the valve, and which, at the same time, will provide for the return flow or relief of the pressure medium from the opposite end of the hydraulic jack.

It is a further object of this invention to provide a control valve as above stated wherein, incident to adjustment of the valve plug from a position for delivery of pressure medium to one of the pressure lines to a position for holding the pressure thereon, or to a position for delivery of the pressure medium to the other line, there will be no blind spots encountered, thereby eliminating the necessity of pressure relief or by-pass valves in the hydraulic system; it being understood that the term "blind spots" as used herein, refers to those certain positions of adjustment of a valve plug in its use, at which the hydraulic circuit, under pressure, is entirely closed to the outlet of the hydraulic medium under the action of the pressure pump. When a valve plug is stopped at such a "blind spot," it is apparent that a tremendous strain will be placed on the pumping mechanism and its connections by reason of a back pressure being suddenly built up in the lines to the pump; this pressure being transmitted to the pump vanes, gears or crank shaft, depending upon the type of pump used. Suffice it to say that "blind spot" pressure, suddenly applied, is extremely detrimental to the equipment and, if continued, causes the hydraulic medium to be heated to an undesirable degree.

It is also an object to prevent loss of pressure in the jack by a novel use back-check valve, and by such location of back-check valves, make possible various ways in which the valve may be connected in a system.

It is a still further object of this invention to provide a four-port, two-way control valve that is practically fool-proof, and which provides a plurality of ways in which it may be connected with a two-line hydraulic system in order to best adapt it to a particular location or position.

Other objects of the invention reside in the use of the valve; in the combination of parts and their construction and mode of operation, as hereinafter will be fully described.

In accomplishing these and other objects of the invention, I have provided the improved details of construction, the preferred forms of which are illustrated in the accompanying drawing, wherein—

Fig. 1 is a sectional view, in the axial plane, of a control valve embodying the present invention.

Fig. 2 is a cross section of the valve, taken on the line 2—2 in Fig. 1.

Fig. 3 is a similar cross sectional view of the valve, together with a diagrammatic illustration of the manner in which it would be functionally connected for the control of a hydraulic jack, and showing the valve plug as adjusted to down position, to obtain upward movement of the jack.

Fig. 4 is another sectional view of the valve, showing the plug adjusted to "holding" position.

Fig. 5 is a similar cross sectional view of the valve, showing the plug in one of its intermediate positions at which the back check relief valves in the valve plug are opened by the pressure.

Briefly described, the valve device embodied by the present invention comprises a body or housing having four ports, for pipe connections, and spaced at 90° intervals about the valve axis; two of the ports providing for pipe connections respectively with the two pressure lines to be supplied and controlled, and the other two ports providing for pipe connections respectively with the pressure pump and a return line to the supply tank for the hydraulic pressure medium. The pump, in this instance, would have a supply connection also with the supply tank. Rotatably contained in the valve housing is a valve plug that may be adjusted rotatably to designated positions for directing the pressure medium from the pump to one or the other of the lines to be supplied, and for permitting return flow of medium from the other line through the valve to the supply tank.

Referring more in detail to the drawing—

The control valve embodied by this invention comprises a valve body, or housing, designated in its entirety by the reference numeral 10. This housing is provided with a base flange 10a adapted to receive bolts or the like by which the valve may be fixedly attached to a selected supporting member.

The valve housing is formed with a valve chamber 11, here shown to be conically tapered, within which chamber is fitted the valve plug 12. The plug is adapted to be rotated and is supported at its opposite ends by means of anti-friction ball bearings, designated at 13 and 14; these ball bearings being contained in the usual raceways which, in turn, are fitted in the valve housing in the conventional manner. A cover plate 15 is applied over one end of the housing to retain the valve plug in place.

Extending from one end of the valve plug 12, through the cover plate 15, is the valve stem 25; this being squared at its outer end and mounts thereon a handle, or lever 26, by means of which the plug may be rotatably adjusted to its various positions of control as will hereinafter be explained.

The valve body, as herein illustrated, in Figs. 2 to 5, is substantially square in cross section, and is provided along its longitudinal corner areas, respectively, with chambers 31, 32, 33 and 34, each of which has a port providing communication with the plug chamber 11; the communicating ports being designated respectively by reference numerals 41, 42, 43 and 44. These ports extend longitudinally of the plug and are spaced at 90° intervals about the plug axis for a purpose presently understood and all are in alinement and of equal dimensions.

It will also be noted by reference to Figs. 1 and 2, that these ports, or passages, are of substantial length but are relatively narrow in width and they extend lengthwise of the valve plug for registration with the ends of passages provided in the valve plug, as will presently be explained.

The chambers provided in the four longitudinal corner areas of the valve body have pipe connections as designated at 51, 52, 53 and 54, which, as shown diagrammatically in Fig. 3, are connected respectively with the top of a hydraulic cylinder C which is to be controlled by the valve; with a hydraulic medium supply tank T; with the bottom of the hydraulic cylinder C; and with the pressure pump P. To complete the system, the pump is connected to the tank T through a pipe X and the pump operates in a manner to deliver the hydraulic pressure medium, drawn from the tank, through pipe 54 to the valve. Return flow of the pressure medium from the cylinder under control, to the supply tank, is through the pipe 52.

The valve plug 12 is provided with a transverse diametric passage 60, which, through its main portion, is of the same cross sectional area as the various ports opening from the corner housing chambers into the valve chamber. However, at its opposite ends, the side walls of this transverse passage diverge angularly as at 60a to provide a relatively wide mouth portion for a purpose presently understood. Arranged at right angles to the passage 60 and also diametrically alined in the valve, are walls 62 and 62' and at opposite sides of these walls, the valve plug is recessed so as to provide the four plug chambers 63, 64, 65 and 66 which, by rotation of the plug, may be brought into registering communication with the four ports leading into the four corner chambers of the valve housing. These cross walls 62 and 62' are provided lengthwise of the plug with rectangular passages, or ports 67 and 67', providing for flow therethrough of the pressure medium when the valve is properly positioned. Each of these passages, or ports, is covered at one end with a back check valve plate 68—68'; the plates being mounted on their respective walls by guide studs 69 fixed in the end portions thereof and extended slidably through openings in the walls. Coiled springs 70 are disposed about the studs between the stud heads 69a and the walls to yieldingly retain the plates in closed position over their respective ports; it being noted that the check plates open in the same direction with reference to the valve plug; that is, with the valve as disposed in Fig. 3, both check plates open by movement toward the left, and close by movement toward the right.

Assuming the device to be so constructed, and to be connected in a hydraulic system as shown in Fig. 3, as previously explained, the mode of operation and control would be as follows:

Assuming the valve plug to be in position as shown in Fig. 4, it is to be understood that, with the hydraulic pressure pump P operating to draw hydraulic pressure medium from the reservoir or tank T through pipe X, this medium will be forced through the pipe 54, into the chamber 34, then through the port 44 and into the plug passage 60, and will be delivered from this passage through the port 42, into the chamber 32, from where it is delivered to the tank T through the pipe 52. With the valve plug in this position, the pumped pressure medium effects no movement of the piston in the hydraulic cylinder C. Thus, this position of the valve is termed the "holding" position.

By moving the handle 26 from the position as seen in Fig. 4, to the position seen in Fig. 2, the valve plug 12 will be rotated accordingly and brought to rest with the passage 60 covered at both ends by the walls of chamber 11 and the plug chambers 63, 64, 65 and 66 respectively in communication with the housing chambers, 31, 32, 33 and 34. The hydraulic medium then delivered under pressure from the pump, forces the back check plate 68' away from the passage 67' in the wall 62', and flows from the housing chamber 34 through the port 44 into the plug chamber 66, then through the port or passage 67' and into the plug chamber 65, through the port 43 and into the housing chamber 33, from where it flows into the pipe 53, and to the bottom of the hydraulic cylinder, causing the piston to move upwardly in the cylinder.

Incident to the upward movement of the piston, the hydraulic medium in the upper end of the cylinder is discharged through the pipe 51 into the housing chamber 31, and flows therefrom through the port 41, plug chamber 63, port 67 in the wall 62 at the left-hand side of the valve by forcing the check plate 68 to open position against the pressure of its retaining spring 70. Opening of check valve 68 allows the pressure medium to flow through the chamber 64, port 42 into the chamber 32, from where it is delivered through pipe 52 to the tank T. Since the operation of the valve with the plug in this position causes an upward movement of the piston, it is termed the "up" position; however, that is only explanatory to the action of the hydraulic cylinder when disposed as in Fig. 3.

It is to be understood that the valve plug 12 may be rotated from a "holding" position, as illustrated in Fig. 4, to an "up" position, as illustrated in Fig. 2, thereby causing the hydraulic piston to move upwardly, and that it may be moved again, back to holding position as seen in Fig. 4, without any loss of pressure in either end of the hydraulic cylinder, and that the piston will be positively held and locked in this position. This retention of pressure is due to the fact that the ports 41 and 43 will then be completely closed by the end surfaces of the two walls 62 and 62' against any back flow of the hydraulic medium from either end of the hydraulic cylinder.

Starting again with the valve plug 12 in the position as seen in Fig. 4, it may also be rotated to the position as shown in Fig. 3; and when in this position, the pressure medium delivered from the pump forces the back check plate 68 away from its port 67 in the wall 62, then at the top of the valve, against the pressure of the retaining spring 70, allowing the pressure medium to flow into the chamber 64 through the port 41 into the housing chamber 31 and be conveyed to the top of the cylinder through the pipe 51, thereby causing a downward movement of the piston in the hydraulic cylinder.

Incident to the downward movement of the piston with the valve plug in the piston of Fig. 3 as explained, the hydraulic medium in the lower end of the cylinder escapes through the pipe 53 into the valve housing chamber 33 through the port 43 into chamber 66 through the port 67' in the wall 62' which is now at the bottom of the valve, by forcing the check plate 68' away from its port 67' against the retaining spring 70' and allowing the hydraulic medium to flow through the chamber 65 and port 42 into the housing chamber 32 and be conveyed by the pipe 52 to the tank T. With the valve plug in this latter position, a downward movement of the piston in cylinder C is caused, and hence this position, for explanation, is termed the "down" position of the valve.

It is now obvious that the valve may be moved from "holding" position, as shown in Fig. 4, to a "down" position as illustrated in Fig. 3, as well as to an "up" position as illustrated in Fig. 2, and that the piston of cylinder C will be held and locked at any position of adjustment by disposing the valve in "holding" position.

However, between "holding" position and "up" position, and likewise between "holding" position and "down" position, there will be an infinite number of intermediate positions, one of which is illustrated in Fig. 5, which shows one position intermediate of "holding" position and "down" position, and it will be noted that the closed end surfaces of the walls at opposite sides of the flared mouth portions of the valve passage 60 are of such narrow width as not to completely close the port 44 or the port 42, across which they are then disposed. In other words, these end surfaces are of substantially lesser width than the ports across which they pass in travel of the valve from one position to the other and therefore cannot operate as a closure for the ports.

It will be understood, by reference to Fig. 5, that the stream of the hydraulic medium entering the port 44 under pressure from the chamber 34, will be divided by the angularly diverging portion of the wall 62a that is then across the port 44, and in moving from "holding" position to the intermediate position illustrated, it is obvious that no back flow of the hydraulic medium will be possible from the chamber 31 to the chamber 34 through the port 67 in the wall 62 by reason of the back check plate 68. Tendency for such back flow might be caused by a sudden or excessive load on the hydraulic piston. As the pressure of the flow of the hydraulic medium reaches a pressure equal to that in the top of the cylinder and also in the chamber 31, the check plate 68 will open the port 67' and a very slow downward movement of the piston is accomplished. Such an operation of the valve is termed a "feathering" of the valve, and valves constructed in accordance with this invention are extremely sensitive to such manipulation, giving very accurate control over a hydraulic system as here described.

It will also be noted, by reference to Fig. 5, that there are no "blind spots" in the valve operation, or areas where the flow of the hydraulic medium from the pump is completely blocked by the valve plug in its rotation. Such "blind spots" as they are termed, place an extremely heavy load or strain on the hydraulic pump mechanism, and cause the hydraulic medium to become extremely heated if encountered frequently, and also make it necessary to provide pressure relief heads or other devices in the hydraulic line to relieve or minimize this load or strain.

A particular advantage of this valve resides in the fact that there is no loss of pressure in the hydraulic cylinder incident to the changing of the position of the valve, and no slipping of the piston that would be incident to such loss of pressure, and that the piston may be accurately and positively controlled in its movement to any desired position and positively locked in that position. These advantages are by reason of the provision of back checks in the wall passages, arranged as shown, and in the fact that the side walls 60a of the mouth portions of the passage 60 are not of a width to cover the valve chamber ports and will permit a divided flow of the pressure medium as previously explained.

It may also be pointed out that this valve is capable of almost universal connection in the hydraulic system, as compared to present available valves which are provided with a much more complicated arrangement of ports, both in the valve body and in the valve plug and that in most present-day valves for a like purpose, there is only one manner in which they may be connected in the hydraulic system.

It will be readily understood that the present valve may be applied and used in various ways other than herein shown, and it is therefore not intended that the appended claims should limit the device to the specific combination herein illustrated, but that they be given an interpretation commensurate with the spirit and scope of the invention disclosed.

For purpose of an easier interpretation of the claims, it will be here stated that the holding position of the valve, at which the ports to the jack are both closed, will be referred to as the "neutral" position, and it is understood that at this position, the connections with the jack are fully closed. The valve passages containing the back check valves will be referred to as the secondary passages, and the diametric passage will be identified as the "open passage"; the circuit including the pump, the valve and the storage tank will be referred to as the "pressure circuit."

Having thus described my invention, what I claim as new therein and desire to secure by Letters Patent is:

1. In a hydraulic system including a one-way circuit for a hydraulic pressure medium and a double acting hydraulic jack; a valve mechanism comprising a housing formed with a plug chamber and a plug rotatably fitted in the chamber for adjustment between two service positions through an intermediate neutral position; said chamber having inflow and outflow ports through which the chamber is connected in the pressure medium circuit and having two other ports through which connections are made, respectively, with opposite ends of the jack; said valve plug having an open passage therethrough whereby, when the plug is in neutral position, the pressure medium circuit will be established directly through the valve, and having two secondary passages adapted, on adjustment of the valve plug, to one or the other of its service ports to establish, through one passage, a direct pressure applying connection between the pressure circuit and one end of the jack, and establish, through the other passage, a relief connection opening into the circuit from the other end of the jack; means in the secondary passages allowing flow of pressure medium in one direction only, said plug passages and chamber ports being so arranged that in an adjustment of the plug from its neutral position to either limit, the flow of pressure medium entering through the inflow port will be divided and progressively decreased through the direct passage and increased accordingly through the connection thus made with the jack.

2. A valve mechanism as recited in claim 1 wherein said secondary passages of the plug are equipped with back check valves adapted to close under influence of back pressure in the jack connections.

3. A valve mechanism of the character described, comprising a housing formed with a plug chamber and a valve plug rotatably fitted in the chamber for quarter turn adjustment in opposite directions through a neutral position; said chamber having four ports spaced at equal angular intervals about the plug axis and said plug being formed with a direct passage diametrically thereof and with secondary passages at opposite sides of the said direct passage; said plug being adapted, when adjusted to a neutral position, to close two opposite ports and establish direct communication through the diametric passage between the two other ports of the chamber, and when adjusted to either of its limits of rotation, to establish communication, through the secondary passages, between the chamber ports then at the same side of the diametric passage; said secondary passages having back check valves therein opening in the same direction, said housing ports and plug passages being so disposed that, in adjustment of the plug from its neutral toward either limit of adjustment, the direct passage will be progressively closed off while the secondary passages are being progressively opened.

4. A valve mechanism comprising a housing formed with a plug chamber, a valve plug fitted in the chamber for adjustment through a neutral position between two service portions; said chamber having an inflow port and an outflow port for connection of the valve in a one-way fluid pressure medium circuit, and having two service ports affording connection with a device to be actuated by application of pressure medium from said circuit, and said plug having a passage therethrough adapted, when the plug is in neutral position, to establish direct flow of pressure medium of said circuit through the valve and having two secondary passages adapted, on adjustment of the plug to one or the other of its service positions, to establish through one of said passages, a direct application of pressure medium to one of the service ports and to establish through the other passage, a return flow of pressure medium from said actuated device to the outflow port in the pressure medium circuit and back check valves in the secondary passages.

5. A valve mechanism as recited in claim 4 wherein the ports of the valve chamber and the passages of the plug are so related that, in making an adjustment of the plug from its neutral position to either service position, the flow of pressure medium through the direct passage will be progressively reduced, while flow through the secondary passages is being progressively increased, and wherein said back-check valves are equipped with means whereby they will be yieldingly held against opening to such extent that high pressure in the secondary passages will be maintained until an overbalancing pressure is built up in the direct passage.

GEORGE S. ALLIN.